United States Patent
Dussell et al.

(10) Patent No.: US 6,266,612 B1
(45) Date of Patent: *Jul. 24, 2001

(54) POSITION BASED PERSONAL DIGITAL ASSISTANT

(75) Inventors: William O. Dussell, Pescardero; James M. Janky, Los Altos; John F. Schipper, Palo Alto; David J. Cowl, Sunnyvale, all of CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/334,521

(22) Filed: Jun. 16, 1999

Related U.S. Application Data

(63) Continuation of application No. 08/738,938, filed on Oct. 24, 1996, now Pat. No. 5,938,721.

(51) Int. Cl.[7] .................................................. G01S 5/02
(52) U.S. Cl. ....................... 701/207; 701/211; 701/213; 342/357.17
(58) Field of Search ..................................... 701/211, 213, 701/1, 207; 342/357.06, 357.1, 357.17

(56) References Cited

U.S. PATENT DOCUMENTS

| | | | |
|---|---|---|---|
| 5,032,083 | 7/1991 | Friedman | 434/112 |
| 5,311,194 | 5/1994 | Brown | 342/357 |
| 5,444,444 | 8/1995 | Ross | 340/994 |
| 5,457,629 | 10/1995 | Miller et al. | 364/424.01 |
| 5,470,233 | 11/1995 | Fruchterman et al. | 434/112 |
| 5,528,248 | 6/1996 | Steiner et al. | 342/357 |
| 5,559,707 | 9/1996 | DeLorme et al. | 364/443 |
| 5,576,687 | 11/1996 | Blank et al. | 340/438 |
| 5,646,629 | 7/1997 | Loomis et al. | 342/357 |
| 5,682,525 | 10/1997 | Bouve et al. | 395/615 |
| 5,699,244 | 12/1997 | Clark, Jr. et al. | 364/420 |
| 5,732,074 | 3/1998 | Spaur et al. | 370/313 |
| 5,790,974 | 8/1998 | Tognazzini | 701/204 |

*Primary Examiner*—Michael J. Zanelli
(74) *Attorney, Agent, or Firm*—Blakely, Sokoloff, Taylor & Zafman LLP

(57) ABSTRACT

A task description is stored in a database accessible by a mobile computer system. The mobile computer system receives positioning information corresponding to its geographic location and indexes the database based on the positioning information when the information indicates that the mobile computer system is in a geographic location that facilitates completion of a task associated with the task description. The database may be resident in the mobile computer system or accessible in other ways, for example, via the Internet. The task description preferably includes a geocode which corresponds to the geographic location at which completion of the task may be facilitated. The task description may also include textual, voice or other message which can be displayed and/or played back to a user. The positioning information may be obtained from a GPS satellite, a GLONASS satellite or a pseudolite. The mobile computer system may be a portable unit, such as a PDA, or integrated within a vehicle.

36 Claims, 2 Drawing Sheets

POSITION BASED PERSONAL DIGITAL ASSISTANT

RELATED APPLICATION

This application is a Continuation of application Ser. No. 08/738,938 filed Oct. 24, 1996, now U.S. Pat. No. 5,938,721 issued Aug. 17, 1999.

FIELD OF THE INVENTION

The present invention relates generally to real time positioning systems and, more particularly, to the use of such systems to control access to computer databases to assist in task scheduling.

BACKGROUND

Personal Digital Assistants (PDAs) have become more and more common in today's society. The term PDA refers generally to mobile computer systems, typically handheld, which users employ for a variety of tasks such as storing telephone and address lists (databases), calendaring information, task (i.e., to-do) lists, etc. Some PDAs also incorporate a wireless communication link, allowing the unit to operate as a portable facsimile device, Internet access device and/or pager. Further, PDAs can be configured to operate with Global Positioning System (GPS) receivers as described in U.S. Pat. No. 5,528,248 to Steiner et al., entitled "Personal Digital Location Assistant Including a Memory Cartridge, A GPS Smart Antenna and a Personal Computing Device" assigned to the assignee of the present invention and incorporated by reference herein.

The GPS utilizes signals transmitted by a number of in-view satellites to determine the location of a GPS antenna which is connected to a receiver. Each GPS satellite transmits two coded L-band carrier signals which enable some compensation for propagation delays through the ionosphere. Each GPS receiver contains an almanac of data describing the satellite orbits and uses ephemeris corrections transmitted by the satellites themselves. Satellite to antenna distances may be deduced from time code or carrier phase differences determined by comparing the received signals with locally generated receiver signals. These distances are then used to determine antenna position. Only those satellites which are sufficiently above the horizon can contribute to a position measurement, the accuracy of which depends on various factors including the geometrical arrangement of the satellites at the time when the distances are determined.

Distances measured from an antenna to four or more satellites enable the antenna position to be calculated with reference to the global ellipsoid WGS-84. Local northing, easting and elevation coordinates can then be determined by applying appropriate datum transformation and map projection. By using carrier phase differences in any one of several known techniques, the antenna coordinates can be determined to an accuracy on the order of ±1 cm.

Although U.S. Pat. No. 5,528,248 describes how a GPS receiver can be integrated with a PDA to display navigation information for a user, it does not describe how positioning information provided to the PDA can be used in other ways.

SUMMARY OF THE INVENTION

According to one embodiment, a computer assisted method of scheduling tasks is provided. The method allows a task description to be stored in a database accessible by a mobile computer system. The mobile computer system receives positioning information corresponding to its geographic location and indexes the database based on the positioning information when the information indicates that the mobile computer system is in a geographic location that facilitates completion of a task associated with the task description.

The database may be resident in the mobile computer system or accessible in other ways, for example, via the Internet. The task description preferably includes a geocode which corresponds to the geographic location at which completion of the task may be facilitated. The task description may also include textual, voice or other messages which can be displayed and/or played back to a user. The positioning information may be obtained from a GPS satellite, a GLONASS satellite or a pseudolite. The mobile computer system may be a portable unit, such as a PDA, or integrated within a vehicle.

A second embodiment provides a computer assisted method of using a geocoded database. In this embodiment, a mobile computer system is transported to a first location having first geographic coordinates at a first time. At the first location, RF signals which contain information indicative of the location of a source of their transmission are received and processed to derive the geographic coordinates of the first location. The geographic coordinates of the first location are associated with a descriptor indicative of the first location in a database associated with the mobile computer system so as to form a geocoded entry in the database and a task to be accomplished at the first location is similarly associated with the geocoded entry in the database.

The mobile computer system is transported to a second location at a second time and RF signals containing information indicative of the source of the signals are received and processed to determine the geographic coordinates of the second location. The geographic coordinates of the second location are analyzed to determine whether the second location is within a predetermined range of the first location and, if so, a user is alerted. The user may be alerted by displaying an alert message, such as a task description corresponding to the task to be accomplished at the first location, on a display associated with the mobile computer system.

A further embodiment provides a mobile computer system having a location determination unit configured to receive and process RF signals containing information indicative of the location of a source of the signals, a database coupled to the location determination unit and including location coordinates indicative of a location of interest and a database interface unit configured to access the database according to the location of the mobile computer system.

BRIEF DESCRIPTION OF THE DRAWINGS

The present invention is illustrated by way of example and not limitation in the figures of the accompanying drawings in which.

DETAILED DESCRIPTION

Figure 1:
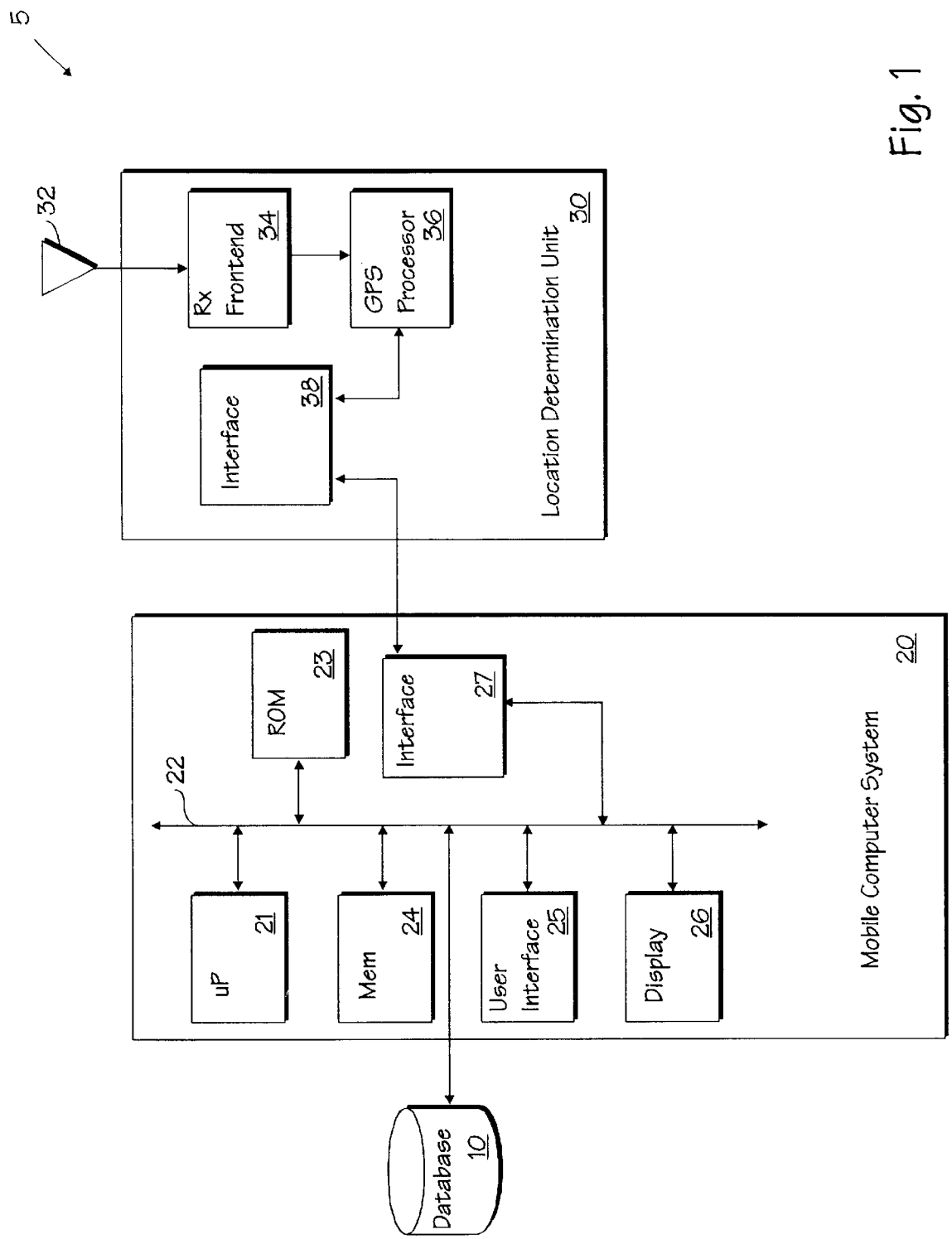
FIG. 1 illustrates a digital system configured with a mobile computer system, a location determination unit and a database according to one embodiment.

The following description of a position based personal digital assistant sets forth numerous specific details in order to provide a thorough understanding of the present invention. However, after reviewing this specification, it will be apparent to those skilled in the art that the present invention may be practiced without some or all of these specific details. In other instances, well known structures, programming techniques and devices have not been described in detail in order not to unnecessarily obscure the present invention.

Some portions of the detailed description which follows are presented in terms of operations on data within a computer memory. These descriptions are the means used by those skilled in the relevant arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring to the accompanying Figure, a digital system 5 having a database 10, a mobile computer system 20 and a location determination unit 30 is shown. Database 10 may be a separate database maintained at some location remote from mobile computer system 20 or it may be a local database maintained within mobile computer system 20. Mobile computer system 20 may be a personal digital assistant or other mobile computer system (e.g., a notebook or other personal computer) or it may be an integrated computer system within a vehicle. Location determination unit 30 may be a Global Positioning System (GPS) receiver of other unit capable of determining a geographic location of an accompanying antenna 32.

It should be appreciated that although database 10, mobile computer system 20 and location determination unit 30 are illustrated as distinct units, in some embodiments these items may comprise a single unit, such as a personal digital assistant or notebook computer. In such embodiments, location determination unit 30 may be housed within a card (PC Card) compatible with the Personal Computer Memory Card International Association PC Card Standard, release 2.0, published by the Personal Computer Memory Card Interface Association (PCMCIA), September 1991. In other embodiments, location determination unit 30 may comprise a GPS Smart Antenna or other GPS receiver.

In yet other embodiments, elements of digital system 5 may form an integrated system within a vehicle, aircraft, boat or other mobile unit and database 10 may be stored within a memory device housed in a PC Card or on another transportable computer readable media such as a disk or CD ROM. Database 10 is preferably a geocoded database and will be described in further detail below. In some cases, mobile computer system 20 may share some circuitry with location determination unit 30. For example, the two units may share a digital signal processor or other microprocessor which performs the computations required to derive the geographic location of the digital system 5 (i.e., antenna 32) using signals transmitted by GPS satellites or other sources (e.g., GLONASS satellites and/or pseudolites).

Mobile computer system 20 typically includes a microprocessor 21 and a system bus 22. Microprocessor 21 is coupled to system bus 22, allowing microprocessor 21 to communicate with the other elements which make up mobile computer system 20, location determination unit 30 and database 10. Mobile computer system 20 may also include a ROM 23 which typically stores computer readable instructions to be executed by microprocessor 21 upon power up. Such instructions may further include an operating system for mobile computer system 20 where such an operating system is not stored within another nonvolatile memory. Mobile computer system 20 may further include a memory (Mem) 24 which may be a volatile memory (i.e., a random access memory or RAM) for use during periods when mobile computer system 20 is powered up. The Mem 24 may also include a hard disk or other long term, nonvolatile memory for storage of application programs and/or data when mobile computer system 20 is not powered up. In other cases, these application programs may be stored in ROM 23. ROM 23 and Mem 24 are typically coupled to system bus 22 to allow access by microprocessor 21. In some embodiments, ROM 23 and Mem 24 may be coupled to microprocessor 21 over a separate memory bus (not shown).

To facilitate use of mobile computer system 20 by an operator, user interface 25 and display 26 are provided and each are coupled to system bus 22. User interface 25 may include a familiar keyboard and mouse (or other pointing device such as a pen). In addition, some mobile computer systems 20 may have a voice synthesizer included as part of user interface 25 to allow activation of various functions by voice command. In other embodiments, the user interface 25 may be a touch sensitive screen which also forms part of a visual display 26. Other user interfaces may also be used. Display 26 may be a visual display such as a liquid crystal display screen, or other screen. In other embodiments, display 26 will include alert lights, such as those commonly found on automobile dashboards. Where mobile computer system 20 is integrated within a vehicle, display 26 may form part of a heads up display or dashboard display within the vehicle. When display 26 forms part of a heads up display, the heads up display may provide information such as the vehicle's current speed and location (e.g., latitude and longitude). The heads up display may further include an area for displaying text messages, such as the task description stored in database 10. Alternatively, the heads up display may only provide an alert indication (such as an icon or an alert symbol, etc.). Such a heads up display may be displayed on an appropriate section of the vehicle's windshield, such as a corner of the windshield near the driver's position or directly above the steering wheel, so as to allow for easy use by the driver without obstructing the driver's view of the road. Display 26 may also include a voice synthesizer (optionally shared with user interface 25) and speaker system to allow for playback of voice messages. This arrangement may allow for voice messages to be played back through the vehicle's existing sound system (e.g., an AM/FM stereo system). Other displays may also be used.

Mobile computer system 20 also includes interface 27 which allows mobile computer system 20 to communicate with location determination unit 30. Interface 27 provides an electrical connection between mobile computer system 20 and location determination unit 30 and may correspond to an RS-232 or RS-422 interface. In some embodiments, where location determination unit 30 comprises a GPS server located as a unit on a vehicle bus system, interface 27 allows for proper electrical coupling between mobile computer system 20 and a vehicle communication bus. As such, interface 27 will be configured according to the protocol for message exchange across the bus.

A communications bus is useful for delivering data and other electronic signals from one device to another in a vehicle. Without use of such a bus, as the number of vehicle devices increases, duplication of vehicle sensors and increasing use of point-to-point wiring between devices is required, which can result in large and needlessly complex wiring looms. Use of such a bus allows use of unduplicated vehicle sensors and minimizes use of point-to-point wiring, by making all measurements and signals available simultaneously to all devices that are connected by the bus. Several standards for such vehicle bus systems exist, for example, the J1587 and J1708 specifications for bus systems published by the Society of Automotive Engineers and the standards for communication buses as set forth by the Society of Automotive Engineers and Controller Area Network (CAN) as documented in ISO 11893:1993, for high speed applications, and in ISO 11519.1:1994—ISO 11519.4:1994, for low speed applications, all of which are incorporated herein by reference.

The J1587 (issued as 1988-01 and in revised form as 1994-01-10 and later revisions) and J1708 (issued as 1986-01 and in revised form as 1990-10-05 and later revisions) specifications recite standards and define signal formats for use of microcomputer systems in heavy duty vehicle applications, such as provision of electronic data on vehicle and component performance, vehicle routing and scheduling, vehicle driver information and vehicle cargo reformation. Each signal that is transmitted using a signal bus complying with these standards includes: (1) a message identification (MID) number (three digits from 0-255, with MIDs 0-127 being defined in J1708 and MIDs 128–255 defined in J1587); (2) one or more measured parameter values associated with and identified by the MID; and (3) a check sum. Parameter update time intervals and priorities for transaction of different groups of MIDs are currently being developed.

The user segment components of a GPS system carried on a vehicle are connected using a communications bus in the same manner as are other devices on the bus. An electrical connection between the server and the bus is made using interface circuitry that complies with applicable standards. Inexpensive interface ICs are readily available for buses that conform to the CAN standards.

Typically, each device that is part of a GPS user segment on a vehicle will have a unique bus address. GPS data can be provided or delivered in two ways. First, a GPS user segment device (such as location determination unit 30) can provide vehicle location, vehicle velocity and/or absolute or local time information for use on the vehicle, using packets that identify the source and destination(s) addresses of such data on the bus and that identify the type of data (location, velocity, time, etc.) contained in the packet.

Second, the GPS data can be provided at a central server, and any device (such as mobile computer system 20) requiring such data can address a data request to the GPS server. The server then packages the requested data in a packet, frame or other suitable format and sends the packaged data directly to the requesting device, using the bus. This approach may be more flexible in that it (1) allows a client to request and promptly receive GPS data and non-GPS data, (2) allows data to be requested and received only when such data is needed, rather than transporting all data on the bus as soon as such data is available, regardless of need, and (3) provides such data in more convenient formats for individual client use. Related GPS data may include GPS receiver health, GPS receiver correction status, vehicle tracking status and other similar information. Information can also be provided to, and stored on, the server to improve or correct the GPS receiver performance. Such information may include real time clock information, to reduce the time required for initial acquisition or reacquisition of GPS satellite signals, and may include DGPS correction data to improve the accuracy of real time determination of vehicle present location. Such DGPS correction data may be obtained from a variety of commercial or other sources using well-known radio-based communications links such as FM subcarriers, private or packet radio links to private servers or servers accessed through the Internet or other cellular phone links.

Location determination unit 30 has an associated antenna 32 for receiving signals from GPS satellites and/or other sources of GPS signals (e.g., pseudolites, FM subcarriers, etc.) Antenna 32 provides the received signals to Receiver (Rx) Front-end 34 where the signals are downconverted and often digitized for further processing by GPS Processor 36.

The manner in which GPS processing is accomplished is well known in the art. Briefly, GPS receivers normally determine their position by computing relative times of arrival of signals transmitted simultaneously from a multiplicity of GPS satellites. These satellites transmit, as part of their message, both satellite positioning data as well as data on satellite clock timing and "ephemeris" data for each satellite. Using this data, the GPS receiver computes pseudoranges which are simply the time delays measured between the received signal from each satellite and a local clock.

Many GPS receivers utilize correlation methods to compute pseudoranges. GPS signals contain high rate repetitive signals called pseudorandom (PN) sequences. The codes available for civilian applications are called C/A codes, and have a binary phase-reversal rate, or "chipping" rate, of 1.023 MHz and a repetition period of 1023 chips for a code period of 1 msec. The code sequences belong to a family known as Gold codes. Each GPS satellite broadcasts a signal with a unique Gold code. For a signal received from a given GPS satellite, following the downconversion process to baseband, a correlation receiver multiplies the received signal by a stored replica of the appropriate Gold code contained within its local memory, and then integrates, or lowpass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with bandwidth commensurate with a 50 bit per second binary phase shift keyed data signal which is superimposed on the GPS waveform.

The above operations are performed by GPS processor 36 (or by a common processor such as microprocessor 21 where location determination unit 30 and mobile computer system 20 share such circuitry) and may be achieved in dedicated hardware or software. The output will be the geographic coordinates (e.g., latitude, longitude and altitude) of the antenna 32. It is assumed here that antenna 32 is positioned such that there is no appreciable difference between its geographic coordinates and those of mobile computer system 20. Also, the positioning information provided by location determination unit 30 may be enhanced through the use of DGPS techniques as is common in the art.

The output of GPS processor 36 is communicated to mobile computer system 20 via interface 38. Interface 38 may be an RS-232 or RS-422 interface. Alternatively, where location determination unit 30 operates as a GPS server, providing location information to a variety of systems within a vehicle, interface 38 will be configured to provide appropriate electrical coupling to a bus interconnecting the various vehicle systems.

As mentioned above, database 10 is preferably a geocoded database. This term is best understood with reference to the manner in which digital system 5 is used by an operator. Typically, mobile computer system 20 will store various application programs, including a scheduling program which allows an operator to store reminders in the form of "To-Do" lists or other forms. Such scheduling programs are common in the art and often allow the user to prioritize tasks to be accomplished according to a variety of criteria, including due dates, etc. The present invention provides a means by which tasks can be scheduled and/or prioritized based on location. Tasks are assigned using a task descriptor (e.g., a text and/or voice message describing the task) and stored in database 10. Typically, the task descriptor will include a reference indicating a location at which the task is to be accomplished. This may be a set of geographic coordinates or, more typically, a name of a business or other location. To illustrate, if the task descriptor is a text message such as "PICK UP MILK", an appropriate reference might be "GROCERY STORE".

Figure 2:
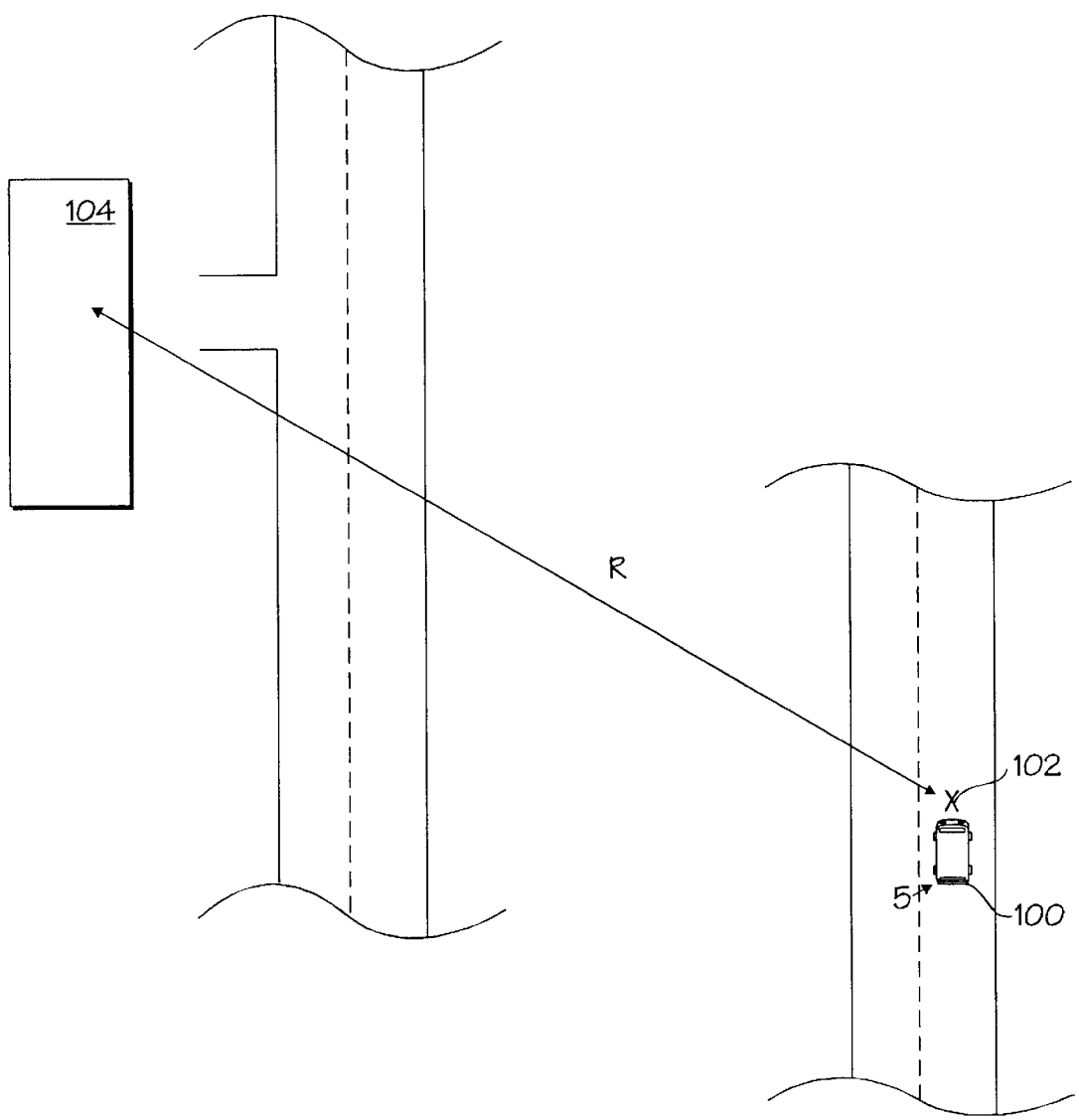
FIG. 2 illustrates a vehicle configured in accordance with the present invention located near a pick-up location.

FIG. 2 illustrates an exemplary situation where a vehicle 100 includes a digital system 5. Vehicle 100 has reached a location 102 which is located a distance "R" from a GROCERY STORE 104. Assuming that a user has previously stored a "PICK UP MILK" task with a reference to the GROCERY STORE as described above, the user will be alerted to "PICK UP MILK" in accordance with the present invention. The manner in which this is accomplished is discussed further below.

After entering the task description in the database, the user will transport mobile computer system 20 such that it is able to access the database 10 (either because database 10 is contained within mobile computer system 20, for example, within Mem 24 or as a PC card or other computer readable storage medium, or because the units are linked via a wireless communications link which may be routed through a cellular telephone or modem system and/or the Internet) and is further able to receive position information from location determination unit 30. Often, mobile computer system 20 will be a PDA and database 10 will either be stored within internal memory (e.g., Mem 24) or within a memory unit on a PC Card or other device attached to the PDA. In such cases, the PDA may also include location determination unit 30. In other cases, the PDA may connect to a docking port or other coupling arrangement within a vehicle. In these cases, location determination unit 30 may operate as a GPS server within the vehicle as discussed above. Of course, mobile computer system 20 itself may be an integrated unit within the vehicle, in which case a memory component such as a PC Card or CD ROM on which database 10 is stored may be the only unit transported by the user. The memory component would be provided to an appropriate device (for example a PC Card port or CD ROM drive), thus making database 10 accessible by mobile computer system 20. Further, database 10 may be maintained on the user's home or business computer system and may be accessed by mobile computer system 20 via a wireless communication link. In some cases, the communication link may be a cellular telephone link. Additionally, the communication link may route messages between mobile computer system 20 and database 10 via the Internet using techniques well known in the art. Although such a link has not been shown in the Figure in order not to obscure the drawing, it will be appreciated that such a communication link would allow database 10 to be updated by more that one user at various times.

At some point, location determination unit 30 will receive and process GPS signals in the manner described above and will provide geographic location coordinates to mobile computer system 20 via interface 38. These geographic location coordinates will correspond to the geographic location of antenna 32, however, it is assumed that mobile computer system 20 is in close enough proximity to antenna 32 such that the location of antenna 32 is substantially the same as the location of mobile computer system 20. This condition will be satisfied, for example, if mobile computer system 20 is transported within the same vehicle as that on which antenna 32 is located. Antenna 32 may be a patch antenna or other antenna suitable for mounting on a vehicle and capable of receiving GPS signals transmitted by GPS satellites or pseudolites.

Once mobile computer system 20 has received the above-mentioned geographic location coordinates (or other positioning information) provided by location determination unit 30, microprocessor 21 will use this information to index database 10. Recall that database 10 contains a task description with an associated location reference (e.g., "GROCERY STORE"). The location reference will have an associated geocode, i.e., an associated set of geographic coordinates. This geocode is established at an earlier time, for example, by storing the location coordinates of the grocery store in the database 10 during an earlier trip to the store, and is associated with the location reference that goes with the task description. Thus, database 10 is a geocoded database that contains task descriptions with associated geocodes. Each time a task description is entered and associated with a location reference, a geocode (corresponding to the location reference) is automatically associated with the task description.

Now, microprocessor 21 uses current positioning information provided by location determination unit 30 to index database 10 and retrieve task descriptions having associated geocodes which are close in proximity (e.g., within a city block radius) to the current geographic location of mobile computer 20. In this way, a user can be alerted to a previously entered task based on the user's current position. To continue the grocery store example, if mobile computer system 20 receives current positioning information from location determination unit 30 which indicates that mobile computer system 20 (i.e., the user) is within a predetermined range "R" (e.g., 100–1600 meters) of the grocery store, the "PICK UP MILK" task description will be retrieved from database 10. This task description (which may also have an associated audio alarm or message) can be visually and/or audibly displayed over display 26 to alert the user that he or she is in close proximity to the grocery store and should go pick up some milk. This feature can be enhanced by displaying a map (using information stored in Mem 24 or database 10) showing the user's current position (based on the location information provided by location determination unit 30) and the location of the grocery store (using the geocode information associated with the stored task description or location reference), thus allowing the user to navigate a route to the grocery store.

In the above description, the database 10 is a database programmed by the mobile computer system 20 user. However, database 10 may be provided as a unit by a commercial vendor. For example, database 10 may be sold as an "Electronic Yellow Pages" on CD ROM or other computer readable format for use by a variety of mobile computer systems 20. In such cases, database 10 may be an Internet Web Page or other resource. Regardless of its physical (or virtual) configuration, database 10 includes geocoded references for a variety of business establishments and other locations (such as historical points of interest, stadiums, theaters, etc.) and is accessible by calendaring, scheduling and/or other application programs running on mobile computer system 20.

Alternatively, database 10 may originate as a commercially purchased unit as described above and may be customized by a user through use. For example, database 10 may have an associated application program which "learns" a user's commute and purchasing habits, for example, by analyzing electronic checkbook and/or other electronic account records and associating those entries with commute patterns derived from position information provided by location determination unit 30. Such a database could be used to prompt a user to make regular purchases (e.g., milk) or deliveries when mobile computer system 10 is in an appropriate geographic location without requiring the user to enter a specific task description.

Such a geocoded database would also be useful for a user who is new to a geographic area. For example, the user could purchase a database 10 for a particular city of interest (for example, shortly after moving to the city) and use the database to locate stores, service providers, or other locations of interest. To illustrate, suppose the user has just purchased a database 10 for ANY CITY and wants to locate the nearest hardware store (to buy items for his or her new home). By providing the mobile computer system 20 with current positioning information from location determination unit 30 and entering a search query via user interface 25 seeking the location of the nearest hardware store, microprocessor 21 could access database 10 based on the positioning information and retrieve and display a list of hardware stores having geocodes which show the stores to be within a predetermined range (say a mile or so) of the users current location. Upon selecting one of the stores from the list, a map (also stored on the media containing database 10) could be visually displayed showing the user's present location and the relative location of the hardware store.

In yet another embodiment, locations for anticipated vehicle stops for a vehicle containing digital system 5 (or elements thereof when database 10 is a remote unit) can be entered in database 10 each day and/or periodically using user interface 25 and can also be entered on-the-fly by use of wireless communications as discussed above. Such an embodiment may find use, for example, in a package pick-up/delivery system or another system where such information is useful. As the vehicle containing digital system 5 follows a course, for example to allow for package pick-up/delivery, mobile computer system 10 accesses database 10 to determine upcoming pick-up/drop-off points. This information can be accessed based on an order of priority or, preferably, based on the location of the vehicle, as described above. In either case, the location of upcoming pick-up/drop-off points can be displayed visually and/or audibly on display 26. In addition, the present location of the vehicle can be displayed using location information provided by location determination unit 30. Such information may be displayed as highlighted markers of a map or as a textual and/or graphical list. For this and other embodiments, e.g., where real-time traffic information is provided (either to a user or directly to mobile computer system 20, for example, via wireless transmissions), such a system may allow a user to determine and navigate a "best route" to the next pick-up/drop-off point.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

It will be further appreciated that the methods and apparatus of the present invention are equally applicable for use with the GLONASS and other satellite-based positioning systems. The GLONASS system differs from the GPS system in that the emissions from different satellites are differentiated from one another by utilizing slightly different carrier frequencies, rather than utilizing different pseudo-random codes. In this situation, substantially all the circuitry and algorithms described above are applicable, however, a receiver need only store a single PN code for use during receive operations.

Thus, a position based personal digital assistant has been described. In the foregoing specification, the present invention has been described with reference to specific exemplary embodiments thereof. It will, however, be evident that various modifications and changes may be made thereto without departing from the spirit and scope of the invention as set forth in the appended claims. The specification and drawings are, accordingly, to be regarded in an illustrative rather than a restrictive sense.

What is claimed is:

1. A computer assisted method of scheduling tasks, comprising the steps of:

storing a task description in a database, said database being accessible by a mobile computer system;

receiving at said mobile computer system positioning information corresponding to the geographic location of said mobile computer system; and indexing said database based on said positioning information so as to retrieve said task description when said position information indicates that said mobile computer system is in a geographic location that is within a selected range of a location at which a task associated with said task description may be performed.

2. The computer assisted method of claim 1 wherein said database is resident in said mobile computer system.

3. The computer assisted method of claim 1 wherein said database is accessible via the Internet.

4. The computer assisted method of claim 1 wherein said task description includes a geocode, said geocode corresponding to said geographic location.

5. The computer assisted method of claim 4 wherein said task description further includes a textual message and said step of storing a task description comprises the steps of:

entering said textual message at a user terminal associated with said database;

associating said textual message with said geocode to produce said task description; and saving said task description in said database.

6. The computer assisted method of claim 5 wherein said positioning information is received from one or more sources of pseudorandom sequence signals containing information indicative of the location of said one or more sources.

7. The computer assisted method of claim 6 wherein at least one of said sources is a Global Positioning System (GPS) satellite.

8. The computer assisted method of claim 6 wherein one of said sources is a pseudolite.

9. The computer assisted method of claim 6 wherein one of said sources is a GLONASS satellite.

10. The computer assisted method of claim 5 wherein said positioning information is received from a GPS receiver.

11. The computer assisted method of claim 5 wherein said step of receiving positioning information comprises:

collecting positioning signals at an antenna associated with said mobile computer system;

downconverting said positioning signals from an RF frequency to an IF frequency to generate downconverting positioning signals; and extracting from said downconverting positioning signals said positioning information.

12. The computer assisted method of claim 11 wherein said positioning information comprises a latitude and a longitude.

13. The computer assisted method of claim 12 further comprising the step of alerting a user that said mobile computer system is in said geographic location after said step of indexing.

14. The computer assisted method of claim 13 wherein said step of alerting comprises playing out a voice message through a voice synthesizer associated with said mobile computer system.

15. The computer assisted method of claim 13 wherein said step of alerting comprises displaying an alert message on a display associated with said mobile computer system.

16. The computer assisted method of claim 13 wherein said mobile computer system is integrated in a vehicle.

17. The computer assisted method of claim 16 wherein said step of alerting comprises playing out a voice message through an audio system associated with said vehicle.

18. The computer assisted method of claim 16 wherein said step of alerting comprises displaying an alert message on a graphical display system associated with said vehicle.

19. The computer assisted method of claim 18 wherein said graphical display system includes a heads up display and said alert message is displayed on said heads up display.

20. The computer assisted method of claim 13 wherein said step of alerting comprises displaying said textual message on a display associated with said mobile computer system.

21. A computer assisted method of using a geocoded database, comprising the steps of:

transporting a mobile computer system to a first location having first geographic coordinates at a first time;

receiving and processing at said mobile computer system a first set of RF signals including pseudorandom sequences containing information indicative of the location of a source of said first set of RF signals to derive said first geographic coordinates;

associating said first geographic coordinates with a descriptor indicative of said first location in a database so as to form a geocoded entry in said database; and associating a task to be accomplished at said first location with said geocoded entry in said database.

22. The computer assisted method of claim 21 further comprising the steps of:

transporting said mobile computer system to a second location having second geographic coordinates at a second time;

receiving and processing at said mobile computer system a second set of RF signals including pseudorandom sequences containing information indicative of the location of a source of said second set of RF signals to derive said second geographic coordinates;

analyzing said second geographic coordinates to determine whether said second location is within a predetermined range of said first location; and alerting a user of said mobile computer system of said task if said second location is within said predetermined range of said first location, otherwise not alerting said user of said task.

23. The computer assisted method of claim 22 wherein said step of alerting comprises displaying an alert message on a display associated with said mobile computer system.

24. The computer assisted method of claim 23 wherein said alert message comprises a text message descriptive of said task and said step of displaying comprises scrolling said text message on said display.

25. The computer assisted method of claim 22 wherein said step of alerting comprises playing back a voice message descriptive of said task through voice synthesizing means associated with said mobile computer system.

26. The computer assisted method of claim 25 wherein said voice synthesizing means includes a vehicle audio system.

27. A mobile computer system, comprising:

a location determination unit configured to receive and process RF signals including pseudorandom sequences indicative of the location of a source of said RF signals to derive a set of location coordinates corresponding to the location of said mobile computer system;

a database coupled to said location determination unit including location coordinates indicative of a location of interest and one or more task descriptors associated with said location of interest; and a database interface configured to access said database according to the location of said mobile computer system.

28. A mobile computer system as in claim 27 wherein said database is stored on a computer readable media.

29. A mobile computer system as in claim 28 wherein said computer readable media is a disk.

30. A mobile computer system as in claim 28 wherein said computer readable media is a CDROM.

31. A mobile computer system as in claim 28 wherein said computer readable media is an EPROM.

32. A mobile computer system as in claim 27 wherein said task descriptor comprises a text message.

33. A mobile computer system as in claim 27 wherein said task descriptor comprises a voice message.

34. A mobile computer system as in claim 27 wherein said location determination unit comprises a GPS server configured to provide said location coordinates to said database interface across a computer bus interconnecting said GPS server and said database interface.

35. A mobile computer system as in claim 34 wherein said database interface comprises a microprocessor configured to access said database.

36. A mobile computer system as in claim 35 wherein said mobile computer system is integrated in a vehicle.

* * * * *